United States Patent
Lee et al.

(10) Patent No.: US 9,268,416 B2
(45) Date of Patent: Feb. 23, 2016

(54) TOUCH CONTROL PEN, TOUCHING CONTROL APPARATUS AND TOUCHING DETECTION METHOD WITH IMAGE DELETE FUNCTION THEREOF

(75) Inventors: Ming-Shian Lee, Taoyuan County (TW); Chung-Hsiang Chang, Taoyuan County (TW); Hsing-Chiang Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 360 days.

(21) Appl. No.: 13/370,295

(22) Filed: Feb. 9, 2012

(65) Prior Publication Data

US 2013/0033437 A1 Feb. 7, 2013

Related U.S. Application Data

(60) Provisional application No. 61/515,329, filed on Aug. 5, 2011.

(51) Int. Cl.
  *G06F 3/033* (2013.01)
  *G06F 3/0354* (2013.01)

(52) U.S. Cl.
  CPC .................................. *G06F 3/03545* (2013.01)

(58) Field of Classification Search
  CPC ................................................ G06F 3/03545
  USPC ....................................... 345/179; 178/19.01
  See application file for complete search history.

(56) References Cited

U.S. PATENT DOCUMENTS

| | | | |
|---|---|---|---|
| 4,697,050 A | 9/1987 | Farel et al. | |
| 5,475,401 A | 12/1995 | Verrier et al. | |
| 5,654,529 A | 8/1997 | Yeung et al. | |
| 6,441,810 B1 | 8/2002 | Skoog et al. | |
| 6,624,832 B1* | 9/2003 | Thomas | 345/173 |
| 6,985,138 B2 | 1/2006 | Charlier | |
| 2001/0006383 A1 | 7/2001 | Fleck et al. | |
| 2002/0040817 A1* | 4/2002 | LeKuch et al. | 345/179 |
| 2003/0214490 A1* | 11/2003 | Cool | 345/179 |
| 2004/0041799 A1* | 3/2004 | Vincent et al. | 345/179 |

(Continued)

FOREIGN PATENT DOCUMENTS

| | | | | |
|---|---|---|---|---|
| CN | 201355482 | | 12/2009 | |
| JP | 07-200133 | * | 4/1995 | ............. G06F 3/033 |

(Continued)

OTHER PUBLICATIONS

"Office Action of European Counterpart Application," issued on Sep. 30, 2014, p. 1-p. 6.

(Continued)

*Primary Examiner* — Adam J Snyder
(74) *Attorney, Agent, or Firm* — Jianq Chyun IP Office

(57) ABSTRACT

A stylus includes a body, a conductive control structure, a charge transporting structure, and a signal transmission module. The body has a first end and a second end opposite to each other. The conductive control structure is configured at the first end and equipped with a control surface. The charge transporting structure is disposed at a side of the body and covers at least one portion of a hand-held region on the side of the body. Besides, the charge transporting structure is electrically coupled to the conductive control structure. The signal transmission module is disposed in the body and transmits a radio frequency signal to the second end according to a trigger signal.

19 Claims, 5 Drawing Sheets

(56) References Cited

U.S. PATENT DOCUMENTS

| | | | |
|---|---|---|---|
| 2004/0140963 A1* | 7/2004 | Kim et al. | 345/179 |
| 2005/0057534 A1 | 3/2005 | Charlier | |
| 2005/0219224 A1* | 10/2005 | Liebenow | 345/173 |
| 2007/0188480 A1* | 8/2007 | Teng et al. | 345/179 |
| 2008/0015916 A1 | 1/2008 | Cossey et al. | |
| 2008/0042998 A1* | 2/2008 | Orsley | 345/177 |
| 2008/0137479 A1* | 6/2008 | Syljuasen et al. | 367/72 |
| 2009/0073144 A1 | 3/2009 | Chen et al. | |
| 2009/0153525 A1* | 6/2009 | Chang | 345/179 |
| 2009/0211821 A1* | 8/2009 | Yeh et al. | 178/19.03 |
| 2009/0277697 A1* | 11/2009 | Bolt et al. | 178/19.01 |
| 2009/0295742 A1* | 12/2009 | Chang et al. | 345/173 |
| 2010/0006350 A1* | 1/2010 | Elias | 178/19.03 |
| 2010/0051356 A1 | 3/2010 | Stern et al. | |
| 2010/0084203 A1 | 4/2010 | Peng | |
| 2011/0080378 A1 | 4/2011 | Hsu | |
| 2011/0162894 A1 | 7/2011 | Weber | |
| 2011/0169756 A1 | 7/2011 | Ogawa et al. | |
| 2011/0169775 A1 | 7/2011 | Liaw et al. | |
| 2011/0297457 A1* | 12/2011 | Yeh et al. | 178/19.01 |
| 2012/0327040 A1* | 12/2012 | Simon et al. | 345/179 |

FOREIGN PATENT DOCUMENTS

| | | |
|---|---|---|
| TW | M350750 | 2/2009 |
| TW | 200937260 | 9/2009 |

OTHER PUBLICATIONS

"Office Action of Taiwan Counterpart Application," issued on Dec. 9, 2014, p. 1-p. 9.

"Office Action of China Counterpart Application", issued on Feb. 12, 2015, p. 1-p. 13.

* cited by examiner

TOUCH CONTROL PEN, TOUCHING CONTROL APPARATUS AND TOUCHING DETECTION METHOD WITH IMAGE DELETE FUNCTION THEREOF

CROSS-REFERENCE TO RELATED APPLICATION

This application claims the priority benefit of U.S. provisional application Ser. No. 61/515,329, filed on Aug. 5, 2011. The entirety of the above-mentioned patent application is hereby incorporated by reference herein and made a part of this specification.

BACKGROUND

1. Technical Field

The disclosure relates to a touching control apparatus, a stylus, and a touching detection method thereof.

2. Background

With advancement of electronic technologies, users mostly input data into electronic products through touch control display panels, and the touch control display panels allow the users to perform touch control not only through fingers but also through styluses.

According to the related art, in order for the stylus to be equipped with multiple input functions, a button may be configured on the stylus, such that a user is allowed to switch from one function to another by means of the stylus. For instance, when a user intends to mark information on the touch control display panel, the user may press the button once, such that the stylus enters an image-marking mode. By contrast, when the user intends to delete an image on the touch control display panel with use of the stylus, the user may continuously press the button for five seconds, such that the stylus enters an image-deleting mode.

The conventional touch control stylus in different modes may transmit radio frequency signals (e.g., with different frequencies) to the touch control display panel, such that the image on the touch control display panel may be marked or deleted. Nonetheless, note that the touch control stylus consumes power regardless of the fact that the image is marked or deleted.

SUMMARY

The disclosure is directed to a stylus for marking or deleting information on a touch control display panel.

The disclosure is directed to a touching control apparatus which applies a stylus for marking or deleting information on a touch control display panel.

The disclosure is directed to a touching detection method for marking or deleting information on a touch control display panel.

In the disclosure, a stylus that includes a body, a conductive control structure, a charge transporting structure, and a signal transmission module is provided. The body has a first end and a second end opposite to each other. The conductive control structure is configured at the first end and equipped with a control surface. The charge transporting structure is disposed at a side of the body and covers at least one portion of a hand-held region on the side of the body. Besides, the charge transporting structure is electrically coupled to the conductive control structure. The signal transmission module is disposed in the body and transmits a radio frequency signal to the second end according to a trigger signal.

In the disclosure, a touching control apparatus that includes a touch control display panel, a stylus, and a controller is provided. The stylus includes a body, a conductive control structure, a charge transporting structure, and a signal transmission module. The body has a first end and a second end opposite to each other. The conductive control structure is configured at the first end and equipped with a control surface. The charge transporting structure is disposed at a side of the body and covers at least one portion of a hand-held region on the side of the body. Besides, the charge transporting structure is electrically coupled to the conductive control structure. The signal transmission module is disposed in the body and transmits a radio frequency signal to the second end according to a trigger signal. The controller is coupled to the touch control display panel. The control surface touches the touch control display panel to form a touch control region on the touch control display panel, and the controller executes an image-deleting action on the touch control region according to an area or a shape of the touch control region.

In the disclosure, a touching detection method is provided. In the touching detection method, a stylus is provided to transmit a radio frequency signal to a touch control display panel. An image-marking action is executed on the touch control display panel according to the radio frequency signal. The stylus touches the touch control display panel to form a touch control region on the touch control display panel, and the touch control region on the touch control display panel is received and detected. According to an area or a shape of the touch control region, an image-deleting action is executed on the touch control region on the touch control display panel.

Based on the above, the conductive control structure configured on the stylus serves as a medium for a user to delete a displayed image on the touch control display panel. Since the conductive control structure does not require power supply, the stylus equipped with the conductive control structure may perform both the image-deleting function and the image-marking function in no need of consuming additional power.

Other features and advantages of the disclosure will be further understood from the further technological features disclosed by the embodiments of the disclosure wherein there are shown and described embodiments of this disclosure, simply by way of illustration of modes best suited to carry out the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
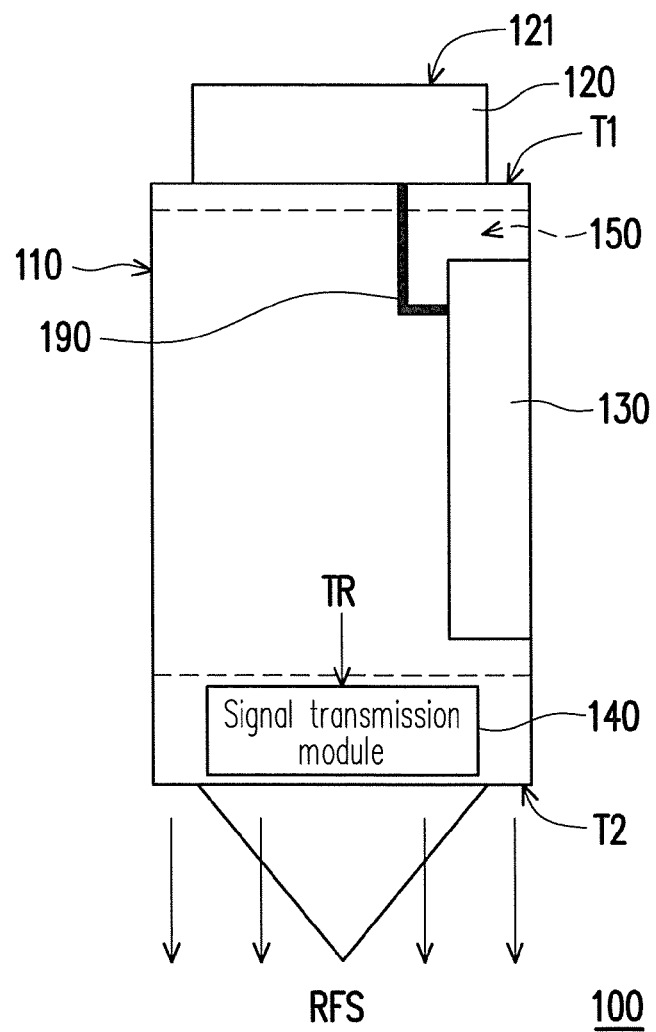
FIG. 1 is a schematic view illustrating a stylus 100 according to an embodiment of the disclosure.

Please refer to FIG. 1 which is a schematic view illustrating a stylus 100 according to an embodiment of the disclosure.

The stylus 100 includes a body 110, a conductive control structure 120, a charge transporting structure 130, and a signal transmission module 140. The body 110 has a first end T1 and a second end T2 opposite to each other. The conductive control structure 120 is configured at the first end T1 of the body 110 and equipped with a control surface 121. The charge transporting structure 130 is disposed at a side of the body 110 and covers at least one portion of a hand-held region 150 on the side of the body 110. Besides, the charge transporting structure 130 is electrically coupled to the conductive control structure 120 through a conductive wire. The signal transmission module 140 is configured in the body 110. According to a trigger signal TR, the signal transmission module 140 transmits a radio frequency signal RFS to the second end T2 of the body 110.

It should be mentioned that the conductive control structure 120 allows a user to perform a touch control action on the surface of the touch control display panel. As long as the conductive control structure 120 effectively touches the touch control display panel, charges on the touch control display panel pass through the conductive control structure 120 and are then transported to the charge transporting structure 130 via the conductive wire 190, and the charges are removed by the user holding the charge transporting structure 130 on the hand-held region 150. By monitoring the movement of the charges, the touch control display panel may detect a touch control region of the touch control display panel where the conductive control structure 120 is in contact, and the image-deleting action may then be executed on the effective touch control region.

Figure 2:
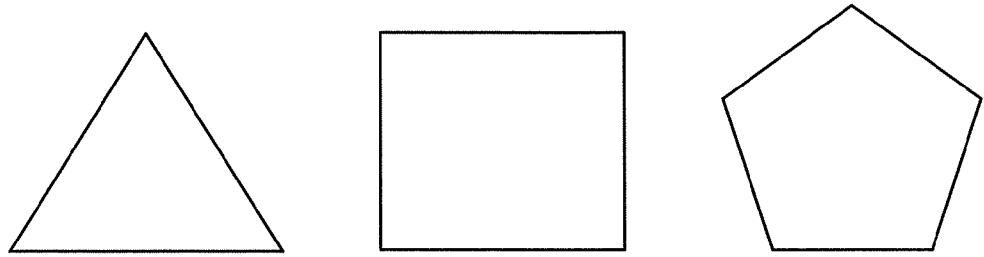
FIG. 2 is a schematic view illustrating different shapes of a control surface 121.

In order to differentiate the action performed by the conductive control structure 120 and detected by the touch control display panel from the touch control action executed by a user's finger, the conductive control structure 120 has the specifically-designed control surface 121. Here, the control surface 121 may be a circular surface, and an area of the circular surface is designed to be smaller than an area of the touch control region of the touch control display panel where a user's finger may touch. Certainly, the control surface 121 may be shaped differently. For instance, the control surface 121 schematically depicted in FIG. 2 may have a triangular shape, a quadrangular shape, a pentagonal shape, or any other polygonal shape.

Here, the hand-held region 150 refers to a touch region defined by the stylus 100 held by a user, and the charge transporting structure 130 may be configured to cover a portion of the hand-held region 150 or the entire hand-held region 150. The conductive wire 190 electrically connecting the charge transporting structure 130 and the conductive control structure 120 may be made of a conductive material configured within or on the body.

As shown in FIG. 1, the signal transmission module 140 serves to receive the trigger signal TR and generate the radio frequency signal RFS according to the trigger signal TR. The radio frequency signal RFS is transmitted toward the second end T2 opposite to the first end T1. When the stylus 100 is applied to mark an image on the touch control display panel, the signal transmission module 140 transmits the radio frequency signal RFS according to the trigger signal TR, and the radio frequency signal RFS is transmitted from the second end T2 of the stylus 100 to the touch control display panel in contact with the stylus 100. Thereby, image-marking actions or other actions are likely to be correspondingly performed on the touch control display panel after the radio frequency signal RFS transmitted to the touch control display panel is detected.

Figure 3A:
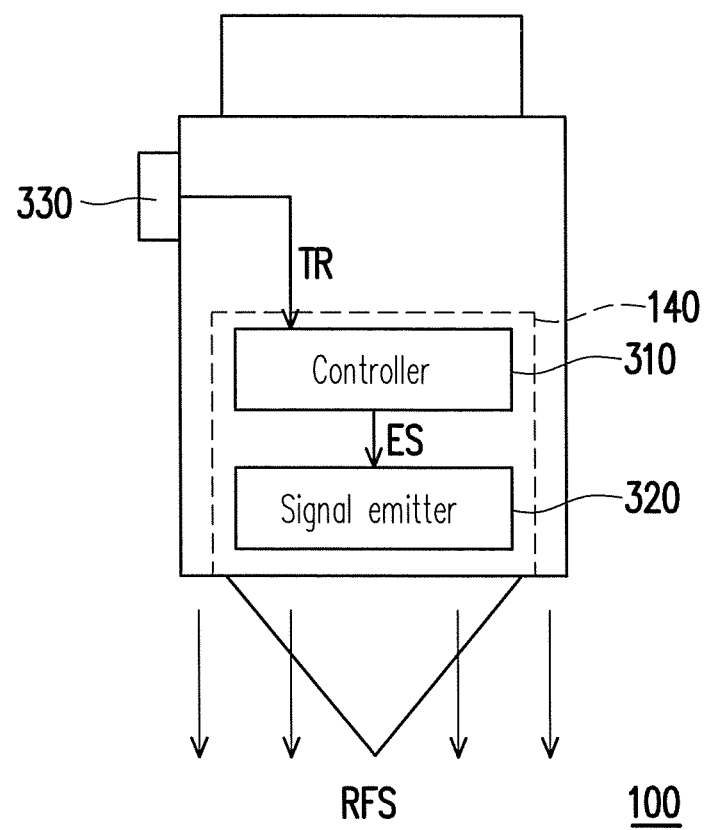
FIG. 3A and FIG. 3B illustrate different implementation modalities of a signal transmission module 140 according to an embodiment of the disclosure.

FIG. 3A illustrate an implementation modality of the signal transmission module 140 according to an embodiment of the disclosure. As shown in FIG. 3A, the signal transmission module 140 includes a controller 310 and a signal transmitter 320 coupled to the controller 310. The controller 310 transmits a trigger command ES according to the trigger signal TR, and the signal transmitter 320 transmits the radio frequency signal RFS according to the received trigger command ES. Besides, in the present embodiment, the trigger signal TR is transmitted by pressing a button 330 that is configured on the stylus 100. The button 330 determines whether to transmit the trigger signal TR or not based on the pressing condition of the button 330 itself. In brief, when the button 330 is being pressed, the button 330 transmits the trigger signal TR to the controller 310; on the contrary, when the button 330 is released, the button 330 stops transmitting the trigger signal TR to the controller 310.

The controller 310 issues the trigger command ES if receiving the trigger signal TR. Here, the signal transmitter 320 not only determines whether to transmit the radio frequency signal RFS according to the trigger command ES but also determines the frequency of the radio frequency signal RFS to be transmitted. Namely, a user is able to perform different touch controls by conditionally pressing the button 330 (e.g., different time frames during which the pressing action is performed and/or the number of times the button 330 is pressed per unit time), and the controller 310 correspondingly issues the trigger command ES according to the condition of the received trigger signal TR (e.g., the time frame during which the trigger signal TR is being received and/or the number of times the trigger signal TR is received per unit time). Based on different trigger commands ES, the signal transmitter 320 is capable of transmitting the radio frequency signal RFS exemplarily with different frequencies, such that the touch control display panel may correspondingly perform various functions.

Figure 3B:
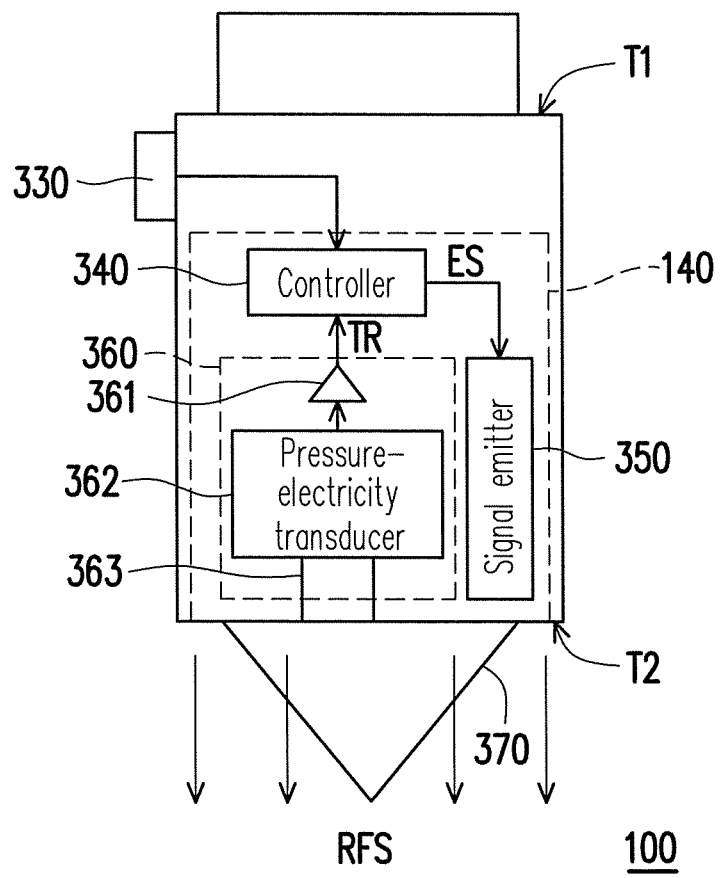

FIG. 3B illustrate another implementation modality of the signal transmission module 140 according to an embodiment of the disclosure. As shown in FIG. 3B, the signal transmission module 140 includes a controller 340, a signal transmitter 350 coupled to the controller 340, and a pressure sensor 360 coupled to the controller 340. In the present embodiment, the tip 370 of the stylus 100 is connected to the pressure sensor 360, and the tip 370 may be moved toward the first end T1 or the second end T2 of the body 110. When the stylus 100 touches the touch control display panel, the tip 370 receives a pressure and is thus moved, so as to transmit the pressure to the pressure sensor 360. The pressure sensor 360 then generates the trigger signal TR based on the pressure transmitted by the tip 370.

In the present embodiment, the controller 340 transmits an trigger command ES to the signal transmitter 350 according to the trigger signal TR received by the controller 340, and the signal transmitter 350 transmits the radio frequency signal RFS toward the second end T2.

It should be mentioned that the stylus 100 described herein may still be equipped with the button 330. A user is able to particularly configure the way to mark an image on the touch control display panel based on the pressing condition of the button 330. For instance, the user may adjust the line weight or the type of marked lines (e.g., straight or dotted lines) on the touch control display panel. Undoubtedly, in the particular configuration of the way to mark an image on the touch control display panel, the controller 340 may be applied to receive the signal transmitted at the time the button 330 is pressed, and then the corresponding trigger command ES may be generated in consideration of the receipt of the trigger signal TR. According to the trigger command ES, the signal transmitter 350 generates the radio frequency signal RFS which may have different frequencies, for instance.

The signal transmitter 350 includes a pressure-receiving medium 363, a pressure-electricity transducer 362, and an amplifier 361. The pressure-receiving medium 363 is disposed at the second end T2 and connected to the tip 370. The pressure-electricity transducer 362 is connected to the pressure-receiving medium 363 and electrically connected to the controller 340. After the movement of the tip 370 is taken into account, the pressure-receiving medium 363 may receive the pressure and conduct the pressure to the pressure-electricity transducer 362. The pressure-electricity transducer 362, after receiving said pressure, transduces the pressure to generate a pressure sensing signal and transmits the pressure sensing signal to the amplifier 361. Here, the pressure sensing signal may be a current signal or a voltage signal. The amplifier 361 receives and amplifies the pressure sensing signal to generate the trigger signal TR, and the amplifier 361 transmits the trigger signal TR to the controller 340.

According to the present embodiment, the pressure-electricity transducer 362 may be made of quartz, and the pressure-receiving medium may be an elastic component (e.g., a spring).

Figure 4:
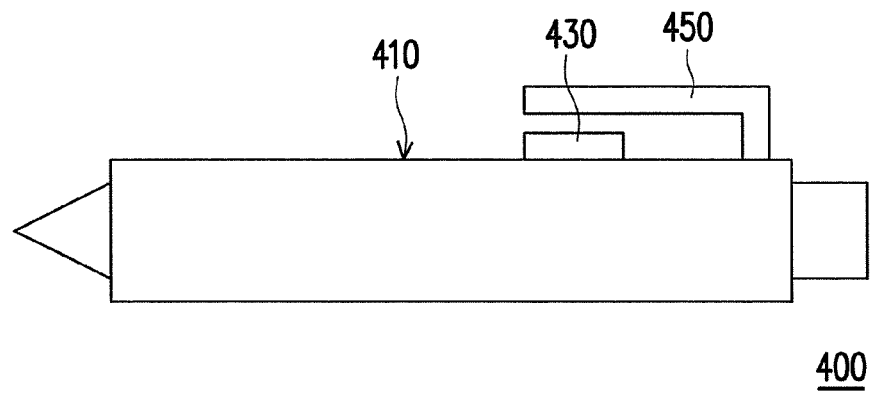
FIG. 4 is a schematic view illustrating a stylus 400 according to another embodiment of the disclosure.

Please refer to FIG. 4 which is a schematic view illustrating a stylus 400 according to another embodiment of the disclosure. In the present embodiment, an elastic sheet 450 is further configured on the body 410 of the stylus 400. One end of the elastic sheet 450 is fixed to the body 410, and the other end of the elastic sheet 450 covers the button 430 and is not in direct contact with the button 430. The elastic sheet 450 serves to protect the button 430. Under the protection, the button is not apt to be touched erroneously and is thus not falsely pressed. As such, the stylus 400 does not consume additional and unnecessary power.

Figure 5:
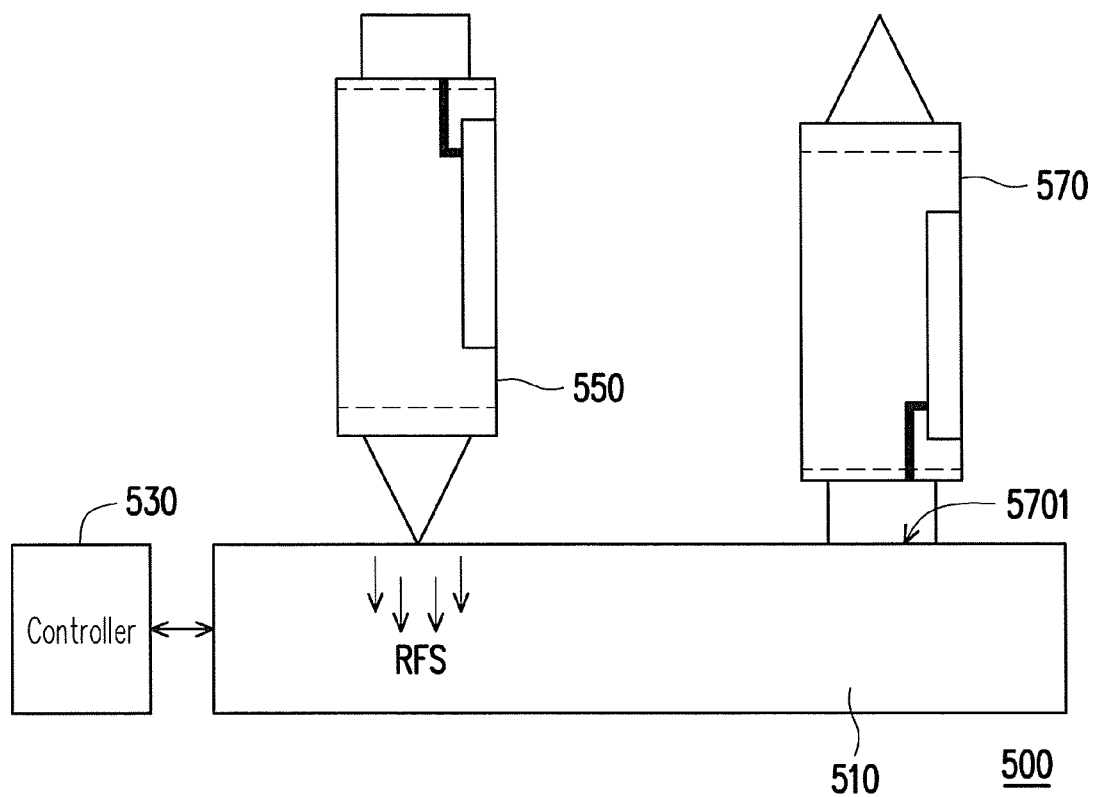
FIG. 5 is a schematic view illustrating a stylus 500 according to an embodiment of the disclosure.

Please refer to FIG. 5 which is a schematic view illustrating a touching control apparatus 500 according to an embodiment of the disclosure. The touching control apparatus 500 includes a touch control display panel 510, styluses 550 and 570, and a controller 530. The controller 530 is coupled to the touch control display panel 530. A control surface 5701 of the stylus 570 touches the touch control display panel 510 to form a touch control region on the touch control display panel 510, and the controller 530 correspondingly deletes an image on the touch control region according to an area or a shape of the touch control region. Besides, based on the radio frequency signal RFS transmitted to the touch control display panel 510 by the stylus 550, the controller 530 also executes an image-marking action in response to the stylus 550. The detailed structures and the movement of the styluses 550 and 570 are elaborated in the previous embodiments, and thus no further description is provided hereinafter.

Figure 6:
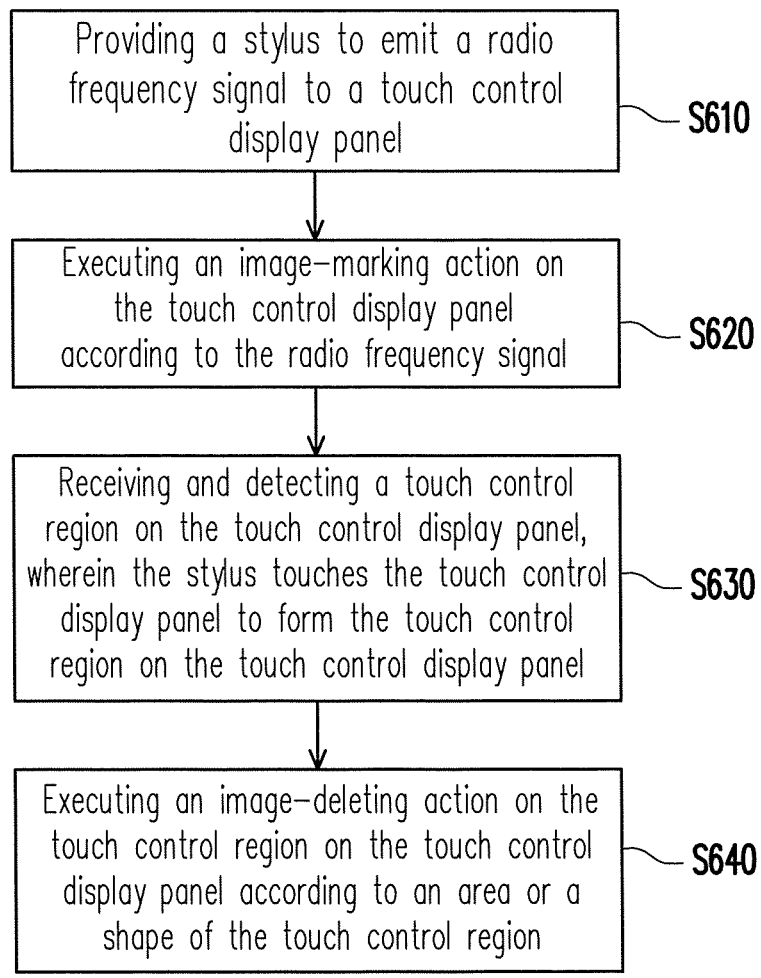
FIG. 6 is a flowchart of a touching detection method according to an embodiment of the disclosure.

FIG. 6 is a flowchart of a touching detection method according to an embodiment of the disclosure. The touching detection method includes: providing a stylus to transmit a radio frequency signal to a touch control display panel (S610); executing an image-marking action on the touch control display panel according to the radio frequency signal (S620); receiving and detecting a touch control region on the touch control display panel, wherein the stylus touches the touch control display panel to form the touch control region on the touch control display panel (S630); executing an image-deleting action on the touch control region on the touch control display panel according to an area or a shape of the touch control region (S640). Since each step of the touching detection method has been elaborated in the previous embodiments, no further description is provided hereinafter.

In light of the foregoing, as provided in the embodiments of the disclosure, the conductive control structure and the signal transmission module are respectively configured at the first end and the second end of the stylus, and the first end is opposite to the second end. The image-deleting action is executed on the touch control display panel by the conductive control structure, and the image-marking action is executed on the touch control display panel by the signal transmission module. Thus, the stylus not only serves to provide a user with a simple and easy-to-use interface but also executes the image-deleting action on the touch control display panel without consuming additional power. Thereby, the overall performance of the touching control apparatus may be augmented.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stylus for interacting with electronic device having touch control display panel and a controller, comprising:
    a body having a first end for deleting information and a second end for marking information, opposite to each other;
    a conductive control structure configured at the first end, the conductive control structure having a predetermined control surface, wherein the predetermined control surface is an N-sided polygonal surface, and N is equal to or greater than 3;
    a charge transporting structure disposed at a side of the body and covering at least one portion of a hand-held region on the side of the body, the charge transporting structure being electrically coupled to the conductive control structure; and
    a signal transmission module disposed in the body and transmitting a radio frequency signal to the second end according to a trigger signal,
    wherein when the predetermined control surface touches the touch control display panel, the N-sided polygonal surface of the predetermined control surface forms a touch control region on the touch control display panel and the controller executes an image-deleting action only when the touch control region formed by the N-sided polygonal surface of the predetermined control surface is detected,
    wherein the predetermined control surface forms the touch control region on the touch control display panel by removing charges on the touch control display panel through the charge transporting structure and the conductive control structure.

2. The stylus as recited in claim 1, wherein the signal transmission module comprises:
    a controller transmitting an trigger command according to the trigger signal; and
    a signal transmitter coupled to the controller, the signal transmitter transmitting the radio frequency signal according to the trigger command.

3. The stylus as recited in claim 2, further comprising:
    a button generating the trigger signal according to type of a push onto the button.

4. The stylus as recited in claim 3, further comprising:
    an elastic sheet, wherein one end of the elastic sheet is fixed to the body, and the other end of the elastic sheet covers the button and is not in direct contact with the button.

5. The stylus as recited in claim 1, wherein the signal transmission module comprises:
- a pressure sensor sensing a pressure exerted on the pressure sensor, so as to generate the trigger signal;
- a controller coupled to the pressure sensor, the controller transmitting an command according to the trigger signal; and
- a signal transmitter coupled to the controller, the signal transmitter the radio frequency signal according to the trigger command.

6. The stylus as recited in claim 5, wherein the pressure sensor comprises:
- a pressure-receiving medium disposed at the second end for receiving and conducting the pressure;
- a pressure-electricity transducer connected to the pressure-receiving medium, the pressure-electricity transducer receiving and transducing the pressure to generate a pressure sensing signal; and
- an amplifier coupled to the pressure-electricity transducer, the amplifier receiving the pressure sensing signal and generating the trigger signal according to the pressure sensing signal.

7. The stylus as recited in claim 6, wherein the pressure-electricity transducer is quartz, and the pressure-receiving medium is an elastic component.

8. A touching control system comprising:
- an electronic device having a touch control display panel and a controller coupled to the touch control display panel;
- a stylus comprising:
  - a body having a first end for deleting information and a second end for marking information, opposite to each other;
  - a conductive control structure configured at the first end, the conductive control structure having a predetermined control surface, wherein the predetermined control surface is an N-sided polygonal surface, and N is equal to or greater than 3;
  - a charge transporting structure disposed at a side of the body and covering at least one portion of a hand-held region on the side of the body, the charge transporting structure being electrically coupled to the conductive control structure; and
  - a signal transmission module disposed in the body and transmitting a radio frequency signal ward the second end according to a trigger signal;
- wherein when the N-sided polygonal surface of the predetermined control surface touching the touch control display panel to form a touch control region on the touch control display panel, and the controller executes an image-deleting action only when the touch control region formed by the N-sided polygonal surface of the predetermined control surface is detected,
- wherein the predetermined control surface forms the touch control region on the touch control display panel by removing charges on the touch control display panel through the charge transporting structure and the conductive control structure.

9. The touching control system as recited in claim 8, wherein the controller further executes an image-marking action on the touch control display panel according to the radio frequency signal.

10. The touching control system as recited in claim 8, wherein the signal transmission module comprises:
- a controller transmitting an trigger command according to the trigger signal; and
- a signal transmitter coupled to the controller, the signal transmitter transmitting the radio frequency signal according to the trigger command.

11. The touching control system as recited in claim 10, further comprising:
- a button generating the trigger signal according to type of a push onto the button.

12. The touching control system as recited in claim 11, further comprising:
- an elastic component, wherein one end of the elastic component is fixed to the body, and the other end of the elastic component covers the button and is not in direct contact with the button.

13. The touching control system as recited in claim 8, wherein the signal transmission module comprises:
- a pressure sensor sensing a pressure exerted on the pressure sensor, so as to generate the trigger signal;
- a controller coupled to the pressure sensor, the controller transmitting an trigger command according to the trigger signal; and
- a signal transmitter coupled to the controller, the signal transmitter transmitting the radio frequency signal according to the trigger command.

14. The touching control system as recited in claim 13, wherein the pressure sensor comprises:
- a pressure-receiving medium disposed at the second end for receiving and conducting the pressure;
- a pressure-electricity transducer connected to the pressure-receiving medium, the pressure-electricity transducer receiving and transducing the pressure to generate a pressure sensing signal; and
- an amplifier coupled to the pressure-electricity transducer, the amplifier receiving the pressure sensing signal and generating the trigger signal according to the pressure sensing signal.

15. The touching control system as recited in claim 14, wherein the pressure-electricity transducer is quartz, and the pressure-receiving medium includes a spring.

16. A touching detection method for an electronic device having touch control display panel and a stylus having a conductive predetermined control surface with an N-sided polygonal surface at one end for deleting information and a signal transmission module at the other end for marking information, the method comprising:
- detecting a radio frequency signal from the signal transmission module of the stylus;
- executing an image-marking action on the touch control display panel according to the radio frequency signal;
- receiving and detecting a touch control region formed by the N-sided polygonal surface of the predetermined control surface on the touch control display panel, wherein the stylus touches the touch control display panel to form the touch control region on the touch control display panel; and
- executing an image-deleting action on the touch control region on the touch control display panel only when the touch control region formed by the N-sided polygonal surface of the predetermined control surface is detected,
- wherein the predetermined control surface forms the touch control region on the touch control display panel by removing charges on the touch control display panel through a charge transporting structure and a conductive control structure.

17. The touching detection method as recited in claim 16, wherein the radio frequency signal transmitted from the signal transmission module of the stylus is generated according to a trigger signal.

18. The touching detection method as recited in claim 17, wherein the trigger signal is generated by providing the stylus to receive a pressure.

19. The touching detection method as recited in claim 17, wherein the trigger signal is generated according to a pressing condition of a button on the stylus.

* * * * *